US007414929B2

(12) United States Patent
Zhao et al.

(10) Patent No.: US 7,414,929 B2

(45) Date of Patent: Aug. 19, 2008

(54) OPTICAL DISC TILT DETECTION AND TILT SERVO CONTROL METHOD

(75) Inventors: Yuanping Zhao, San Jose, CA (US); Ainobu Yoshimoto, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 503 days.

(21) Appl. No.: 10/946,866

(22) Filed: Sep. 22, 2004

(65) Prior Publication Data

US 2006/0072414 A1 Apr. 6, 2006

(51) Int. Cl.
*G11B 7/00* (2006.01)

(52) U.S. Cl. ................................ 369/44.32; 369/53.19

(58) Field of Classification Search ............. 369/53.19, 369/44.32

See application file for complete search history.

(56) References Cited

U.S. PATENT DOCUMENTS 5,216,649 A * 6/1993 Koike et al. .............. 369/44.23
5,430,699 A * 7/1995 Matsubara et al. ....... 369/44.32
5,905,255 A * 5/1999 Wakabayashi et al. ... 250/201.5
6,169,715 B1 1/2001 Nakamura et al. ....... 369/44.32
6,259,665 B1 * 7/2001 Nagasato ................. 369/53.19
6,430,130 B1 8/2002 Furukawa ................ 369/53.19
6,434,096 B1 8/2002 Akagi et al. ............. 369/44.32
6,449,229 B1 * 9/2002 Kim et al. ................ 369/53.19
6,459,664 B1 10/2002 Yamada et al. ........... 369/44.32
6,493,296 B1 12/2002 Fukumoto et al. ........ 369/44.32
6,549,493 B1 4/2003 Nakamura et al. ....... 369/44.32
6,577,568 B1 6/2003 Konishi et al. ........... 369/44.32
6,587,409 B1 7/2003 Yamazaki et al. ........ 369/44.28
6,625,093 B1 9/2003 Hong et al. .............. 369/44.32
6,690,632 B1 2/2004 Sato et al. ................ 369/53.19
6,735,157 B2 5/2004 Hirai et al. ............... 369/53.19
6,751,175 B1 * 6/2004 Maeda et al. ............ 369/53.19
2003/0031105 A1 * 2/2003 Maekawa ................ 369/47.53
2003/0147314 A1 * 8/2003 Kondo et al. ............. 369/44.32
2004/0114485 A1 * 6/2004 Maekawa ................ 369/53.24
2004/0257974 A1 * 12/2004 Lai ........................... 369/286
2005/0002285 A1 * 1/2005 Ando et al. .............. 369/44.14
2005/0063262 A1 * 3/2005 Maeda et al. ............ 369/44.32

* cited by examiner

*Primary Examiner*—Wayne Young
*Assistant Examiner*—Van T. Pham
(74) *Attorney, Agent, or Firm*—Christopher P. Maiorana, PC

(57) ABSTRACT

A method for detecting and controlling disc tilt in an optical disc mechanism comprising the steps of (A) measuring a 2-dimensional displacement of an optical lens of the optical disc mechanism, (B) extracting an absolute value of a disc tilt angle in the optical disc mechanism based upon the 2-dimensional displacement and (C) controlling deflection of a tilt moving coil according to the absolute value of the disc tilt angle.

16 Claims, 9 Drawing Sheets

LASER BEAM 114
PHOTO DETECTORS 112
PHOTO DETECTOR OUTPUTS
HOUSE MOTION CONTROLLED BY SLED MOTOR (E.G., DELTA_X)
LENS 106
TILT
FOCUS
LENS MOTION (FOCUS AND TILT) CONTROLLED BY VOICE COIL MOTOR (E.G., FOCUS = DELTA_Y)
OPU 102
108
118
SLED MOTOR
111
110
TILT ANGLE θ
OPTICAL DISC 104
116a
116b
DISC TRACK
116n
OPTICAL AXIS

FOCUS COIL VOLTAGE VS TIME- DISC A

FOCUS COIL VOLTAGE VS TIME - DISC B

FOCUS COIL VOLTAGE VS TIME - DISC C

OPTICAL DISC TILT DETECTION AND TILT SERVO CONTROL METHOD

FIELD OF THE INVENTION

The present invention relates to optical discs generally and, more particularly, to a method and/or apparatus for implementing an optical disc tilt detection and tilt servo control in an optical disc system.

BACKGROUND OF THE INVENTION

Conventional optical discs for disc recorders or players must provide an ideal plane in order for an incident laser beam to be always perpendicular to the disc surface. However, in real world applications, such optical discs can have mechanical distortion that creates an angular deviation (or tilt) with respect to the laser beam. The deviation angle (represented by the Greek letter THETA) is generally referred to as disc tilt. Disc tilt affects disc read back by degrading signal quality and enlarging the data error rate. In the case of disc recording, tilted recording data is hard to read back by other players without a similar tilt, or with a different tilt pattern. Disc tilt changes from disc to disc. Disc tilt can change even from zone to zone within the same disc. To compensate for disc tilt changes, some kind of tilt servo control is required to eliminate the problems caused by the disc tilt.

Normally, disc tilt is so tiny that detection is not easy. One way to determine disc tilt involves detecting or comparing signal amplitude or intensity. The signals involved can include a photo diode signal (RF), a tracking error signal (TE), a focus error signal (FE), wobble or even. a signal generated by differential phase detection (DPD) or differential push-pull (DPP) techniques. Conventional solutions that detect or compare signal amplitude or intensity to determine disc tilt can be found in U.S. Pat. Nos. 6,690,632; 6,625,093; 6,587,409; 6,577,568; 6,549,493; 6,493,296; 6,169,715 and 6,459,664.

Conventional signal detection and comparison methods, no matter which signal is used, tend to be less effective in real applications. Signal deviation caused by factors other than disc tilt can be larger than the deviation caused by the disc tilt. The tilt angle belongs to a geometry catalog. The signal deviation is a composite result caused by multiple factors including tilt. Any signal deviation observed is not a root cause of tilt, nor a geometric measurement. Although signal deviation does change with tilt, decoupling the component caused by disc tilt from multiple other components caused by other factors is very difficult. Thus, any method dealing with signal deviation cannot provide an ultimate solution.

Other conventional solutions involve using (i) a dedicated photo sensor for disc tilt detection (e.g., U.S. Pat. Nos. 6,434,096 and 6,430,130 implement such an approach) or (ii) an additional optical detection system with independent photo-electronics and an overlapped optical path (e.g., U.S. Pat. No. 6,735,157). Although dedicated photo sensors have been used in commercial products, such systems have problems such as (i) high cost, (ii) low resolution, (iii) extra power consumption and (iv) beam position error because the sensing beam is always away from the main laser beam. Furthermore, a dedicated photo sensor needs extra calibration procedures to provide information that can be trusted. A misaligned sensor is even worse than no tilt control.

SUMMARY OF THE INVENTION

The present invention concerns a method for detecting disc tilt in an optical disc mechanism comprising the steps of (A) measuring a 2-dimensional displacement of an optical lens of the optical disc mechanism, (B) extracting an absolute value of a disc tilt angle in the optical disc mechanism based upon the 2-dimensional displacement and (C) controlling deflection of a tilt moving coil according to the absolute value of the disc tilt angle.

The objects, features and advantages of the present invention include providing an optical disc tilt detection and tilt servo control method that may (i) use geometric relationships in an optical drive mechanism, (ii) detect disc tilt information by looking into disc cross section, (iii) measure 2-dimensional displacements of an optical lens, (iv) extract absolute value of the disc tilt angle, (v) control the deflection of a tilt moving coil according to the detected disc tilt angle, (vi) exploit existing servo back-end signals, (vii) use no front-end signals from the servo or data channels, (viii) provide an ultimate solution, (ix) be simple to implement, (x) require no additional hardware, (xi) be implemented in firmware, (xii) provide a single laser beam solution, (xiii) have no beam position error, (xiv) be sensitive and reliable, (xv) provide high resolution and/or (xvi) provide a low cost solution.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
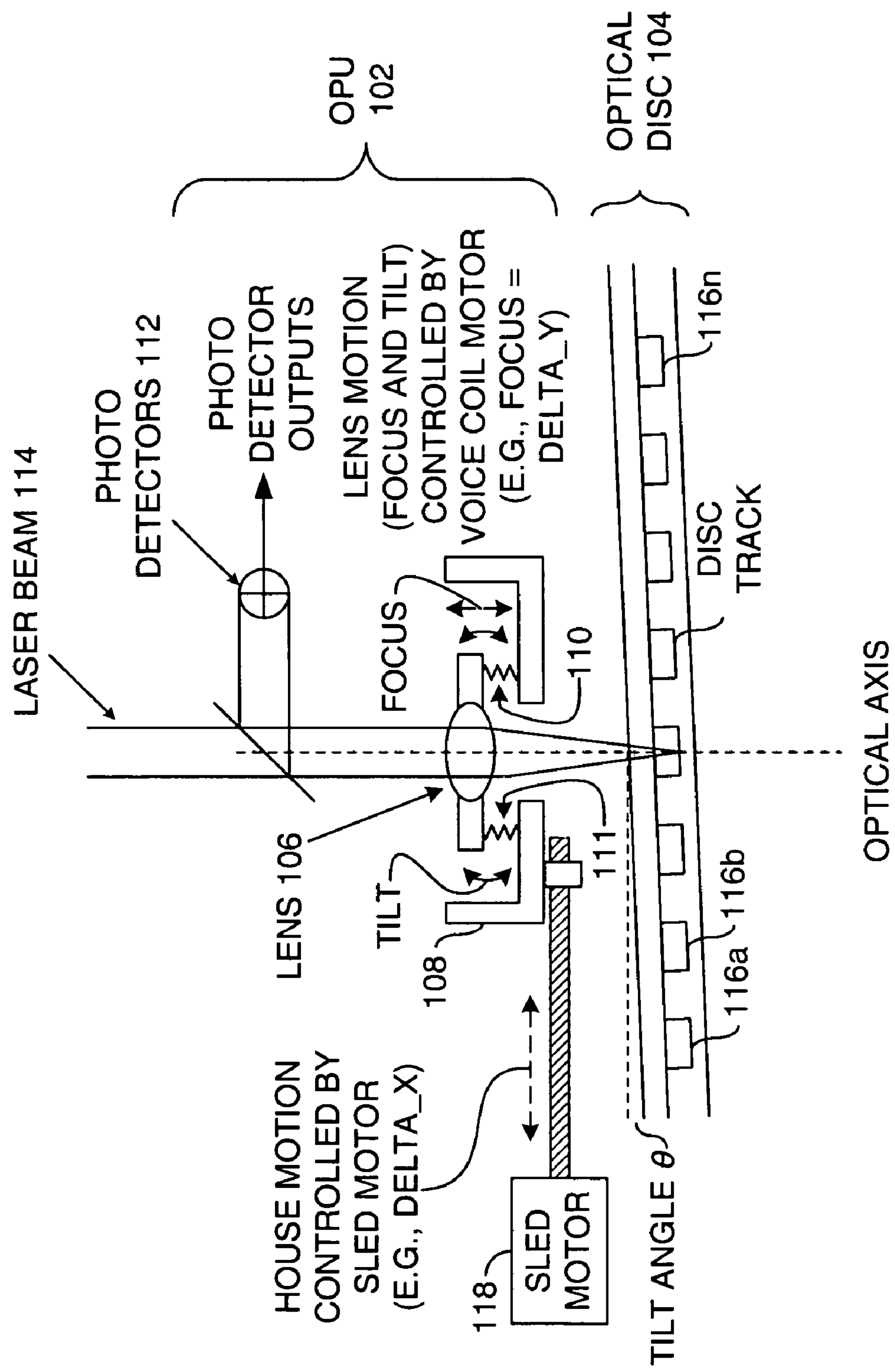
FIG. 1 is a block diagram illustrating disc tilt in an optical drive mechanism in accordance with the present invention.

Referring to FIG. 1, a block diagram illustrating an optical drive apparatus 100 in accordance with a preferred embodiment of the present invention is shown. The apparatus 100 may comprise an optical pick-up unit (OPU) 102 configured to read and/or write data on an optical disc 104. The OPU 102 may be implemented using commercially available devices (e.g., Hitachi, etc.). The OPU 102 may comprise a lens 106, a housing (or sled) 108, a focus coil 110, a tilt coil 111 and a number of photo detectors 112. Each of the focus coil 110 and the tilt coil 111 may be implemented, in one example, with a voice coil motor. The focus and tilt generally use two separate coils. The separate focus and tilt coils are generally placed at the same physical location. The coils 110 and 111 are illustrated separately for clarity.

The lens 106 is generally positioned to focus a laser beam 114 on a track 116*a-n* of the optical disc 104. The lens 106 may be moved relative to the optical disc 104 on a first axis (e.g., DELTA_X) by a sled motor 118 and on a second axis (e.g., DELTA_Y) by the focus coil 110. In general, when focus is adjusted, both sides of the lens 106 are moved up or down. When tilt is compensated, one side of the lens 106 generally is moved up while the other side is moved down, or vice versa (e.g., represented by the curved arrows marked TILT in FIG. 1).

The present invention generally uses a geometric relationship present in optical disc drive mechanisms to detect disc tilt. In an ideal optical drive mechanism, the optical disc 104 is in a plane that is perpendicular to an optical axis of the OPU 102. However, in a real world mechanism the optical disc 104 generally is not perfectly perpendicular to the optical axis (e.g., due to mechanical variations in the drive or the disc, warping of the disc, thickness variations in disc coating, etc.). The difference between the ideal position of the optical disc 104 and the actual position is generally referred to as disc tilt. Disc tilt is generally measured by a disc tilt angle (e.g., THETA).

In general, disc tilt has components in both radial and tangential directions. Radial tilt generally affects an optical disc system more than tangential tilt. As used herein, tilt generally refers to radial tilt. Current commercial OPUs contain tilt moving coils that compensate for tilt in the radial direction. The present invention generally provides tilt detection and tilt compensation control in the radial direction.

Tilt compensation generally begins by determining the disc tilt angle THETA. The true, absolute disc tilt angle THETA may be determined using a sled position value (e.g., DELTA_X) and a lens focus position value (e.g., DELTA_Y) according to the following Equation 1:

$$\text{THETA}=\text{Arctangent}[(\text{DELTA\_}Y)/(\text{DELTA\_}X)], \quad [1]$$

where, DELTA_X represents the sled displacement (e.g., in number of tracks) and DELTA_Y represents a focus coil displacement within the range of DELTA_X. The number of tracks may be counted track by track, or revolution by revolution of spindle operation. The disc tilt angle THETA is generally small enough (e.g., less than 0.8 degree) to be accurately determined using the following Equation 2:

$$\begin{aligned}\text{THETA} &= [(\text{DELTA\_}Y)/(\text{DELTA\_}X)](\text{radian}) \quad [2]\\ &= [(\text{DELTA\_}Y)/(\text{DELTA\_}X)] * 180/PI(\text{degree}).\end{aligned}$$

Figure 2:
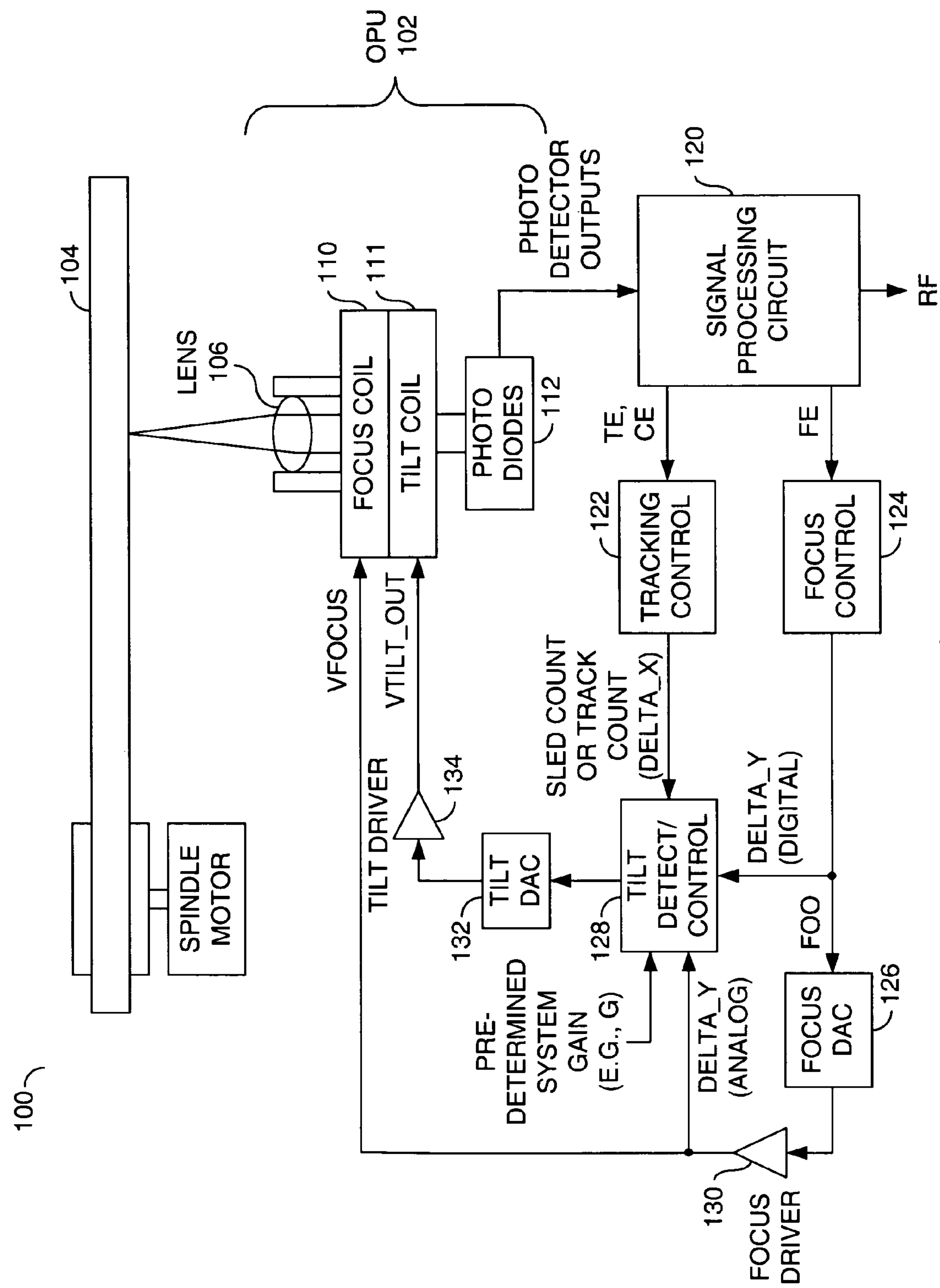
FIG. 2 is a block diagram illustrating example control logic of an optical drive apparatus in accordance with the present invention.

Referring to FIG. 2, a block diagram illustrating example control logic of the optical drive apparatus 100 in accordance with the present invention is shown. The apparatus 100 may further comprise a circuit (or block) 120, a circuit (or block) 122, a circuit (or block) 124, a circuit (or block) 126, circuit (or block) 128, a circuit (or block) 130, a circuit (or block) 132 and a circuit (or block) 134. The circuit 120 may be implemented as a processing circuit. The circuit 122 may be implemented as a tracking control circuit. The circuit 124 may be implemented as a focus control circuit. The circuit 126 may be implemented as a focus control digital-to-analog converter (DAC). The circuit 128 may be implemented as a tilt detection/control circuit. The circuit 130 may be implemented as a focus driver circuit. The circuit 132 may be implemented as a tilt digital-to-analog converter (DAC). The circuit 134 may be implemented as a tilt driver circuit.

The lens 106 is generally positioned, with respect to the optical disc 104, using tracking signals (e.g., SLED COUNT or TRACK COUNT) and a focusing signal (e.g., VFOCUS). In one example, the lens 106 may be coupled to the tilt coil 111. Alternatively, the tilt coil 111 may be coupled to the optical disc 104 (e.g., via a spindle motor). The tilt coil 111 is generally controlled to maintain a perpendicular relationship between an optical axis of the lens 106 and the plane of the optical disc 104.

The photo detectors (or diodes) 112 in the optical pick-up unit 102 are generally configured to generate a plurality of photo detector output signals. The photo detector output signals are generally presented to an input of the processing circuit 120. The processing circuit 120 may be implemented using conventional techniques. The processing circuit 120 is generally configured to generate a plurality of control signals and/or data signals in response to the photo detector output signals received from the photo diodes 112. For example, the signal processing circuit 120 may have a first output that may present a signal (e.g., FE), a second output that may present a number of signals (e.g., TE and CE), and a third output that may present a signal (e.g., RF). The signal FE may be implemented as a focus error signal. The signal TE may be implemented as a tracking error signal. The signal CE may be implemented as a centering error signal. The signal RF may be implemented as an information signal. However, other outputs and/or signals may be implemented accordingly to meet the design criteria of a particular implementation.

The circuit 122 may be configured to receive the signals TE and/or CE. The circuit 122 may be further configured, in one example, to generate the tracking signal SLED COUNT and/or the tracking signal TRACK COUNT in response to the signal TE and/or the signal CE. The circuit 122 may have an output that may present the tracking signals SLED COUNT and TRACK COUNT. In one example, the circuit 122 may be configured to control the sled motor 118. The sled motor 118 is generally configured to position the optical pick-up unit 102.

The circuit 124 may have an input that may receive the signal FE. The circuit 124 may be configured, in one example, to generate a signal (e.g., FOO) in response the signal FE. The signal FOO may comprise, in one example, an averaged focus control signal. The circuit 124 may have an output that may present the signal FOO to an input of the circuit 126 and an input of the circuit 128. The signal FOO may correspond to the lens focus position value DELTA_Y in the digital domain.

The circuit 126 may be configured to control the focus driver circuit 130. The focus DAC 126 and the focus driver circuit 130 may be configured to generate the signal VFOCUS in response to the signal FOO. The signal VFOCUS may comprise an analog signal (e.g., a DC voltage). In one example, the signal VFOCUS may be used to control a focus mechanism (e.g., the voice coil motor 110) of the optical pick-up unit 102. The signal VFOCUS may correspond to the lens focus position value DELTA_Y in the analog domain.

The circuit 128 may be configured to receive the tracking signal SLED COUNT and/or TRACK COUNT from the circuit 122. The circuit 128 may be further configured to receive the signal VFOCUS and a predetermined system gain value (e.g., G described in more detail below). The circuit 128 may have an output that may present a signal to an input of the circuit 132. The circuit 128 may be configured to generate the output presented to the circuit 132 in response to one or more of the tracking signals SLED COUNT and TRACK COUNT, the DELTA_Y value in the digital domain, the DELTA_Y value in the analog domain and the pre-determined system gain (e.g., Ga in the analog domain or Gd in the digital domain).

In one example, a single circuit 128 may be implemented to perform tilt detection and control. Alternatively, multiple circuits 128*a-n* may be implemented to provide longer sampling intervals with more frequent disc tilt angle detection (described in more detail in connection with FIGS. 10(A-B)). When multiple circuits 128*a-n* are implemented, the circuits 128*a-n* are generally connected in parallel. Each of the circuits 128*a-n* may be configured to start and stop a respective disc tilt angle determination (detection) at different times and/or phases. Performing disc tilt angle detection at different times (or phases) allows generation of disc tilt angle values at more times (e.g., more frequently) than with a single phase (e.g., a single circuit 128). In general, the circuits 128*a-n* may be implemented as duplicates of the single circuit 128.

The circuit 130 may be configured to generate an output in response to the signal received from the circuit 128. The output of the circuit 132 may be coupled to an input of the circuit 134. The circuit 134 may have an output that may present a signal (e.g., VTILT_OUT). The signal VTILT_OUT may be implemented, in one example, as a control signal. The circuit 128, 132 and 134 may be configured to generate the signal VTILT_OUT in response to one or more signals received from the tracking control circuit 122, the focus control block 124, the focus driver circuit 130, and the predetermined system gain. In one example, the signal received from the focus driver circuit 130 may comprise a DC voltage for controlling the focus moving coil 110 in the optical pick-up unit 102. In another example, the signal received from the focus control unit 124 may comprise a focus control output data signal (e.g., the signal FOO) configured to control the focus control digital-analog-converter (DAC) 126. The signal VTILT_OUT may comprise a control signal that be used to control a deflection of the tilt coil 111.

In a servo control system of the apparatus 100, the lens focus position value DELTA_Y may be detected (or determined) in the analog domain using the DC voltage difference across the focus moving coil 110 (e.g., the signal VFOCUS). Alternatively, DELTA_Y may be detected in the digital domain based upon an averaged focus control output data value (or signal) presented to a focus control DAC (e.g., the signal FOO). Because the focus control voltage generally changes in higher bandwidth according to the focus servo control (e.g., as illustrated by the oscilloscope waveforms described in connection with FIGS. 9(A-C)), the individual value or data is generally sampled and averaged to extract the true DC value (or mean value) for DELTA_Y detection. The value of DELTA_Y may be obtained, in one example, according to the following Equation 3:

$$\text{DELTA\_}Y = Y(k) - Y(k-1) = \left[\sum_i (FOO)i - \sum_j (FOO)j\right] \Big/ N \quad [3]$$

where, k is the current sampling order number, k−1 is the last sampling order number, N is the number of samples for each Y displacement measurement and the range of i and j is from 0 to N−1. Both i and j belong to different but consequential (consecutive) time intervals.

DELTA_X is generally determined using the position of the sled 108. In one example, DELTA_X may be determined from a sled counter, or track counter. Since an optical disc generally has a fixed track width (e.g., WTRK), DELTA_X may be determined according to the following Equation 4:

$$\text{DELTA\_}X = M*WTRK, \quad [4]$$

where M is the track count.

Once the disc tilt angle THETA is determined, the disc tilt angle may be scaled using a predetermined system constant (e.g., K) to a level sufficient for providing compensation of the detected disc tilt angle. The scaled disc tilt angled may be presented as a value (or signal) DELTA_VTILT. The value DELTA_VTILT may be summed with a predetermined reference level (e.g., VREF) and a calibrated offset value (e.g., VTILT_OFFSET). The values VREF and VTILT_OFFSET may be determined from the optical disc mechanism using conventional techniques. In one example, the value DELTA_VTILT may comprise a dynamic (AC) component of tilt error and the value VTILT_OFFSET may comprise a static (DC) component of tilt error.

In one example, the signal VTILT_OUT may be generated by summing the values (or signals) DELTA_VTILT, VREF and VTILT_OFFSET. The signal VTILT_OUT may be presented to the tilt driver 134. The tilt driver 134 is generally configured to drive the tilt moving coil 111 to implement the tilt servo control. The signal VTILT_OUT may be expressed, in one example, by the following Equation 5:

$$\text{VTILT\_OUT} = \text{VREF} + \text{DELTA\_VTILT} + \text{VTILT\_OFFSET} \quad [5]$$

where, $$\begin{aligned} \text{DELTA\_VTILT} &= K * \text{THETA} \quad [6] \\ &= K * \text{DELTA\_}Y / \text{DELTA\_}X \\ &= K * \text{DELTA\_}Y / (M * WTRK) \end{aligned}$$

Equation 6 may be rewritten as:

$$\text{DELTA\_VTILT} = G*\text{DELTA\_}Y, \quad [7]$$

where G represents a system gain with respect to disc tilt. G is generally a fixed (e.g., predetermined) value based on system parameters including K and WTRK, once M is determined.

In general, M may be determined in such a way that a whole disc travel of the sled 108 (about 46,000 tracks) is divided into a number of DELTA_X measurement sections (or segments). In one example, the number of measurement sections may be in a range from 10 to 46, inclusive. Each DELTA_X measurement section may have, for example, 1,000 to 4,600 tracks. The number of tracks in a DELTA_X measurement section is generally referred to as the length of DELTA_X. When a plurality of measurement sections are implemented, the value of M may range, for example, from 1,000 to 4,600, inclusive. The larger the value of M, the more precise the measurement of DELTA_Y may be. The tilt control may also be more accurate with larger values of M. However, larger values of M generally increase DELTA_Y sampling time. The smaller the value of M, the shorter the DELTA_Y sampling time. The shorter the DELTA_Y sampling time, the smaller the control interval (e.g., response time). The smaller the control interval, the more benefit to real time tilt compensation. In particular, setting M to a certain number (e.g., 3200) may produce a system gain G equal to unity, as illustrated by the following Equation 8:

$$DELTA\_VTILT=DELTA\_Y \text{ (when } M=3200). \quad [8]$$

The system gain in the analog domain (e.g., Ga) is generally (i) proportional to focus coil sensitivity (e.g., Sf) and tilt voice coil resistance (e.g., Rtilt) and (ii) inversely proportional to N, M, disc track width WTRK, tilt voice coil sensitivity (e.g., Stilt), focus voice coil resistance (e.g., Rf) and gain of a tilt voice coil driver (e.g., Gtilt). For example, the analog gain Ga may be expressed by the following Equation 9:

Ga is proportional to:

$$(Sf*Rtilt)/(N*M*Wtrk*Stilt*Rf*Gtilt). \quad [9]$$

The system gain in the digital domain (e.g., Gd) may be determined using the above relationship and taking into account both focus coil driver gain (e.g., Gfocus) and focus DAC resolution (e.g., Qfoo) as illustrated by the following Equation 10:

$$Gd \text{ is proportional to: } Ga*(Qfoo/Gfocus). \quad [10]$$

For a specific optical disc system, all the above parameters are generally fixed. G is generally a fixed value once a system is built up. As a result, G may be used as a predetermined system constant for long term use once determined based on Equation 9 or 10.

Figure 3:
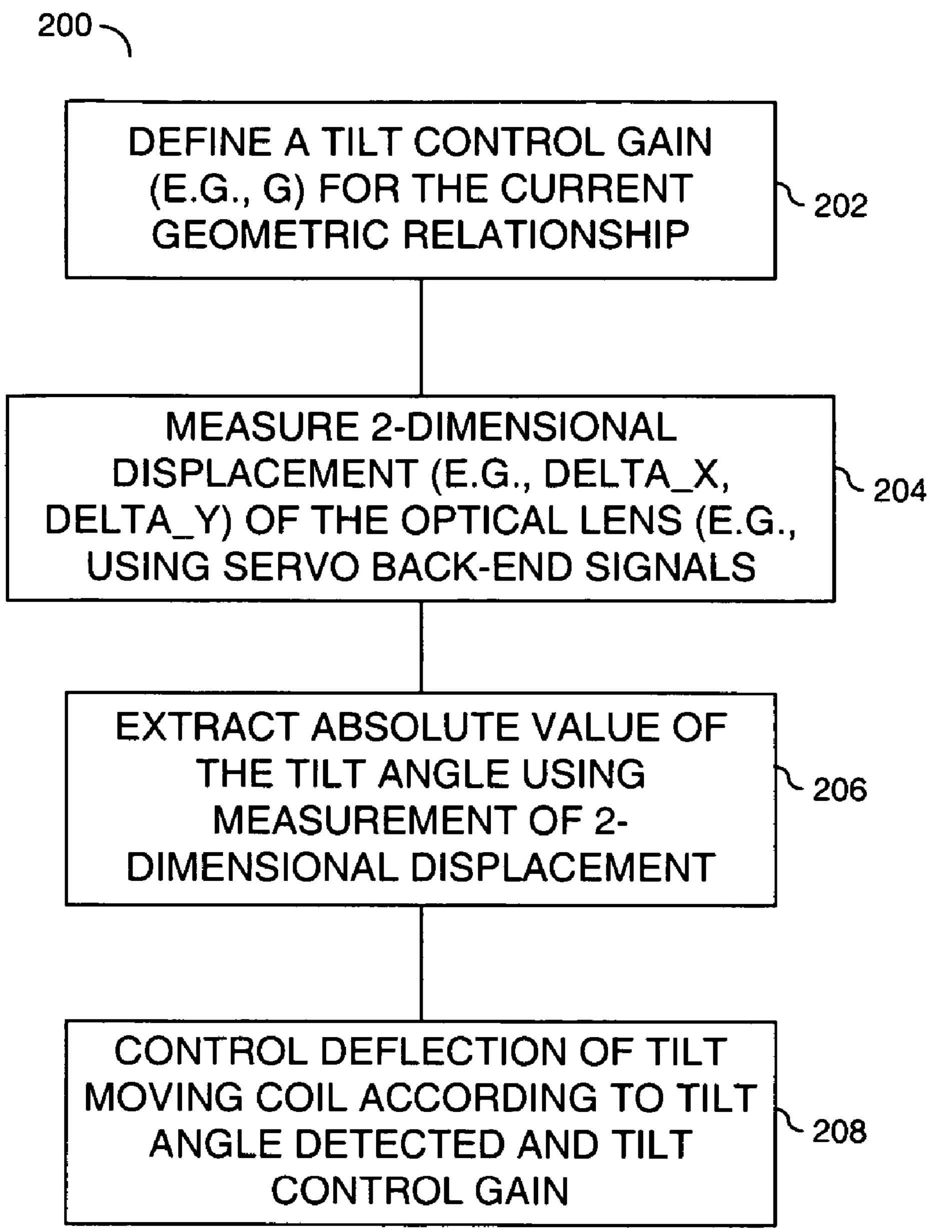
FIG. 3 is a flow diagram illustrating a tilt detection and control process in accordance with a preferred embodiment of the present invention.

Referring to FIG. 3, a flow diagram 200 is shown illustrating a tilt detection and control process in accordance with a preferred embodiment of the present invention. Physically, disc tilt and tilt control belong to geometry catalog of an optical drive mechanism. The present invention generally uses the geometric relationship in the optical disc driving mechanism, instead of the conventional methods. Specifically, the process 200 may begin with determining (or defining) a tilt control gain G for the optical disc driving mechanism (e.g., the block 202). The process 200 generally obtains information regarding disc tilt with respect to a particular disc by examining a cross section of the optical disc. For example, a 2-dimensional displacement of the optical lens is generally measured (e.g., the block 204). For example, the 2-dimensional displacement may comprise a sled position value (e.g., DELTA_X) and a lens focus position value (e.g., DELTA_Y). In one example, the present invention generally exploits existing servo back-end signals. In contrast to conventional solutions, the present invention generally does not utilize front-end signals from servo and/or data channels.

The process 200 generally continues by extracting an absolute value of the disc tilt angle THETA using the measured 2-dimensional displacement of the lens (e.g., the block 206). The deflection of a tilt moving coil in an optical pick-up unit is generally controlled according to the disc tilt angle detected and the predetermined system tilt control gain (e.g., the block 208).

Figure 4A:
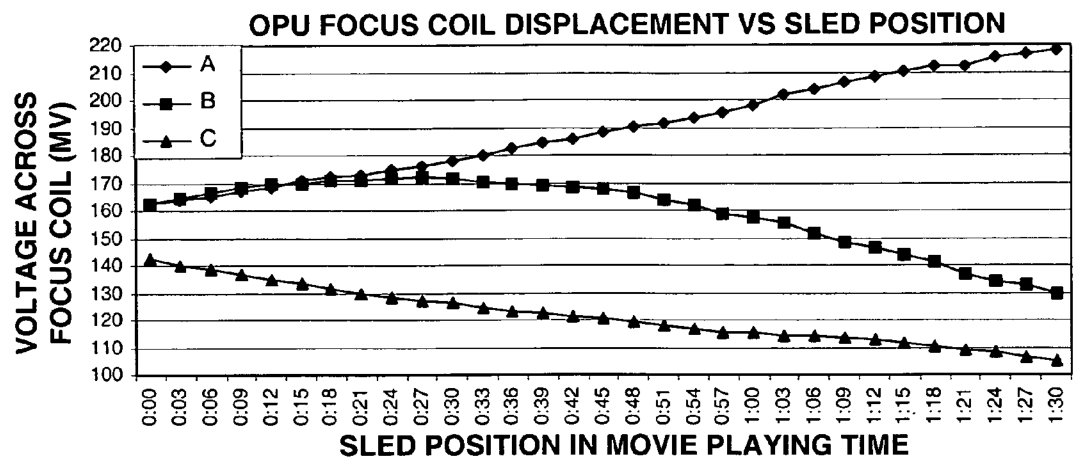
FIGS. 4(A-C) are graphs illustrating fine pitch tilt measurements made on three example optical discs.
Figure 4B:
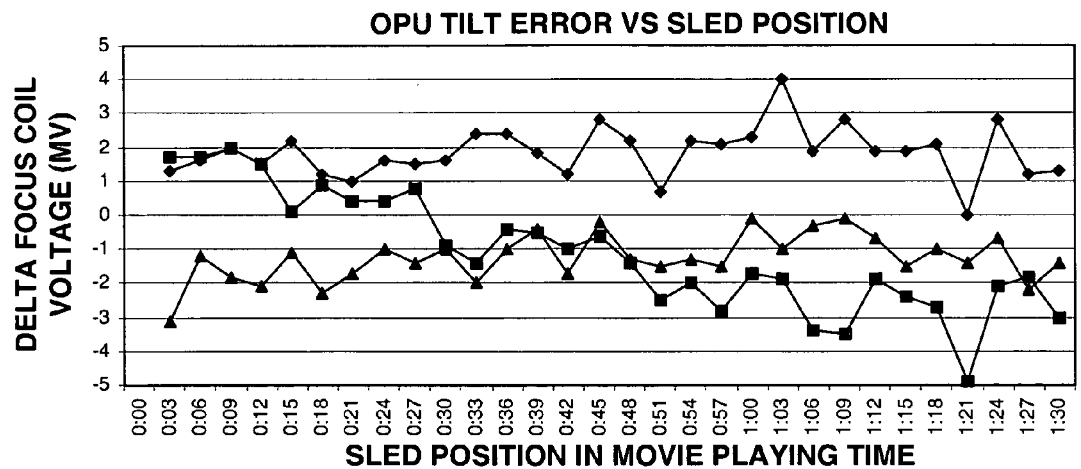
Figure 4C:
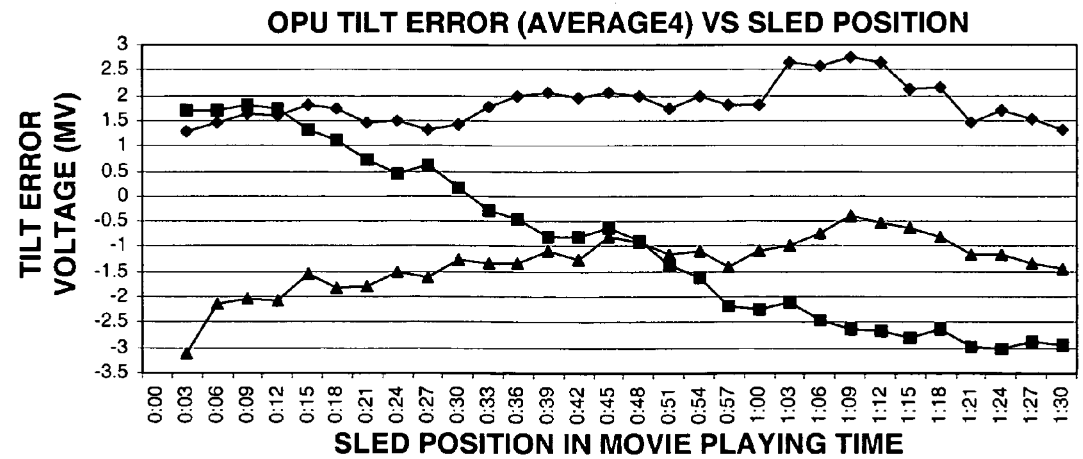

Referring to FIGS. 4(A-C), graphs are shown illustrating various tilt related measurements in fine pitch for three example optical discs (A, B and C) with respect to sled position. The measurements illustrated include optical pickup unit focus coil displacement versus sled position (FIG. 4A), optical pickup unit tilt error versus sled position (FIG. 4B), and optical pickup unit tilt error, averaged every four points, versus sled position (FIG. 4C). The sled position is generally based on playing time of each optical disc.

Figure 5A:
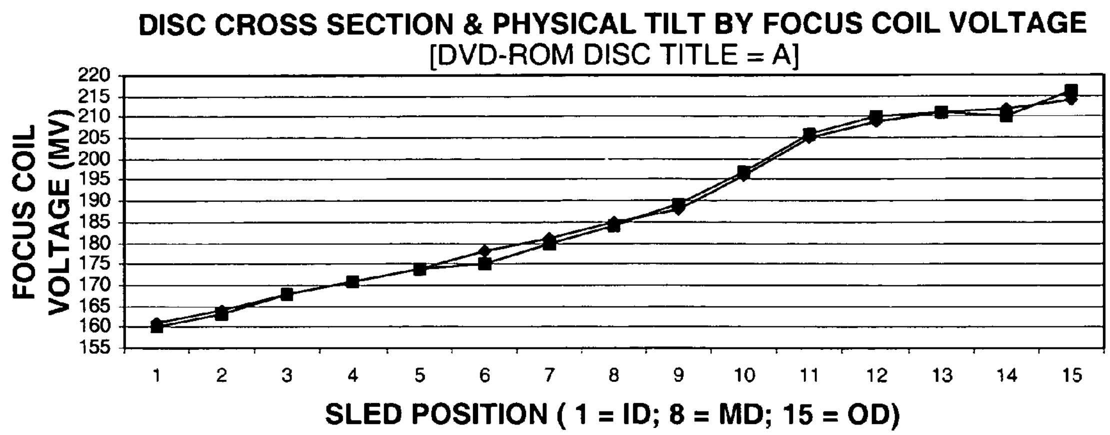
FIGS. 5(A-C) are graphs illustrating disc cross section and physical tilt by focus coil voltage, measured on three example optical discs.
Figure 5B:
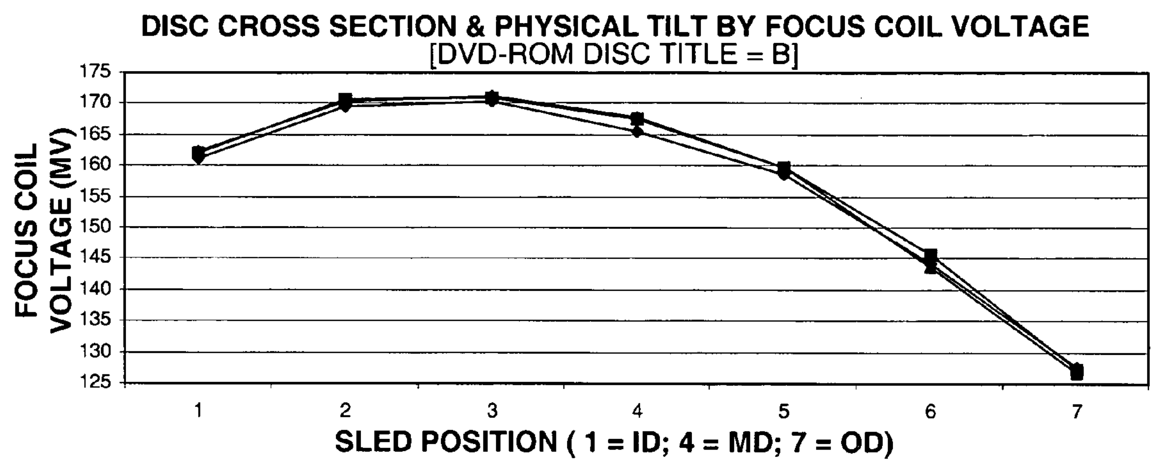
Figure 5C:
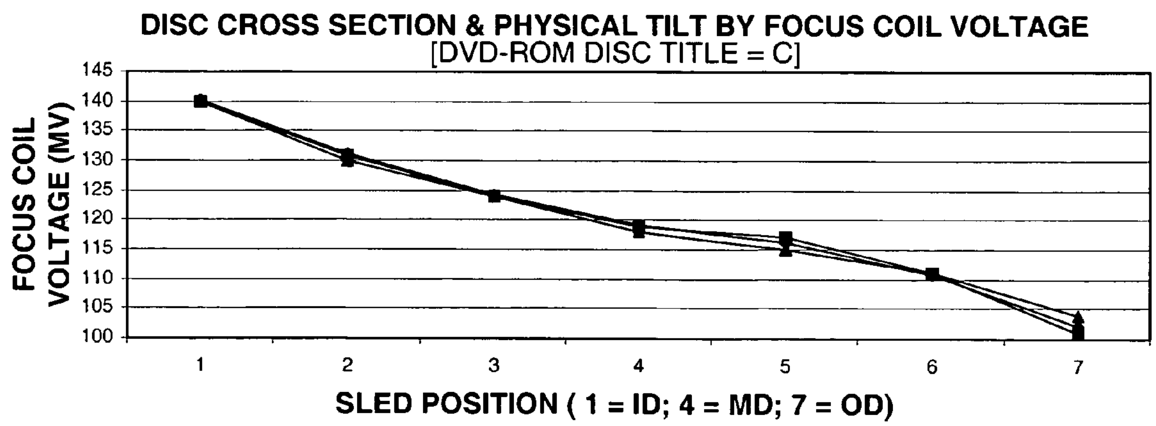

Referring to FIGS. 5(A-C), graphs illustrating a number of measurements of disc cross section and physical tilt by focus coil voltage for each of the three example optical discs A, B and C are shown. The graphs illustrate multiple measurements of each disc cross section and physical tilt using focus coil voltage for the first optical disc A (FIG. 5A), the second optical disc B (FIG. 5B), and the third optical disc C (FIG. 5C). The designations ID, MD and OD generally refer to inner disc, mid-disc and outer disc, respectively.

Figure 6A:
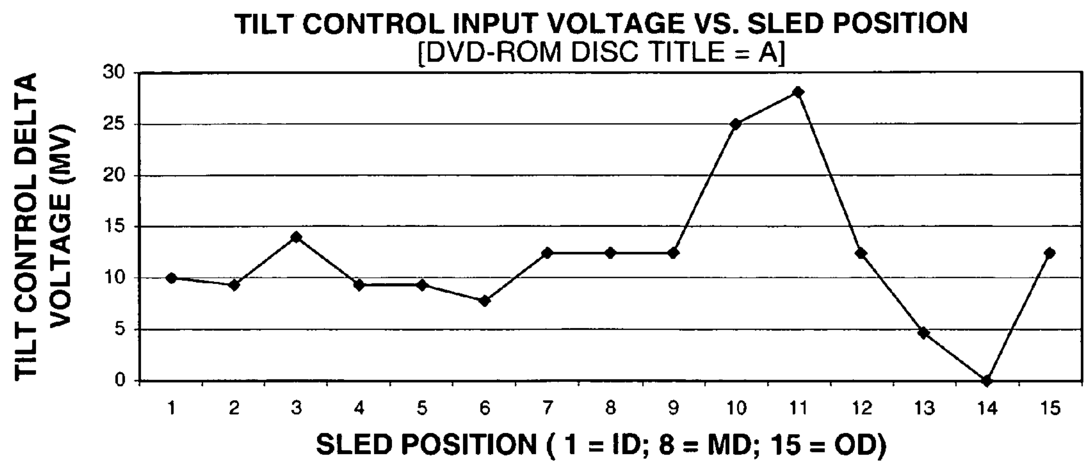
FIGS. 6(A-C) are graphs illustrating tilt control input voltage versus sled position for three example optical discs.
Figure 6B:
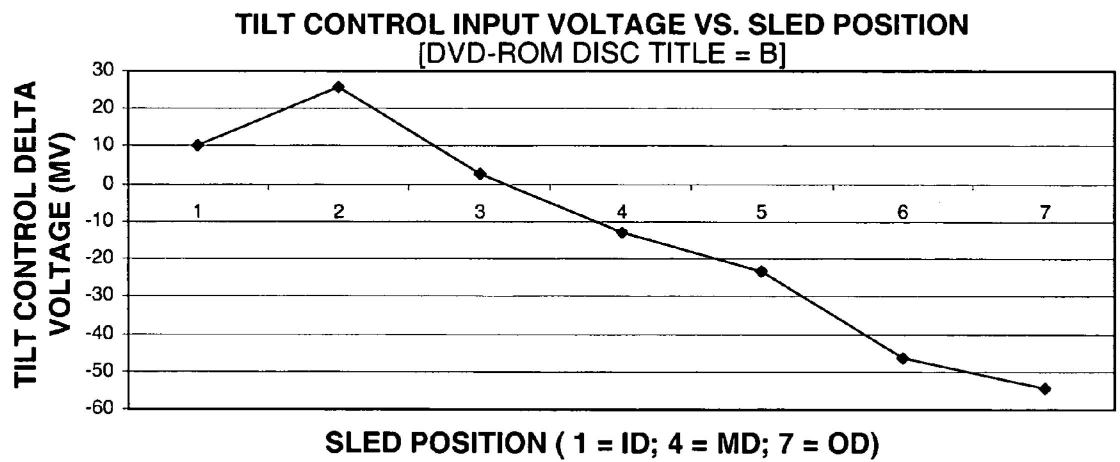
Figure 6C:
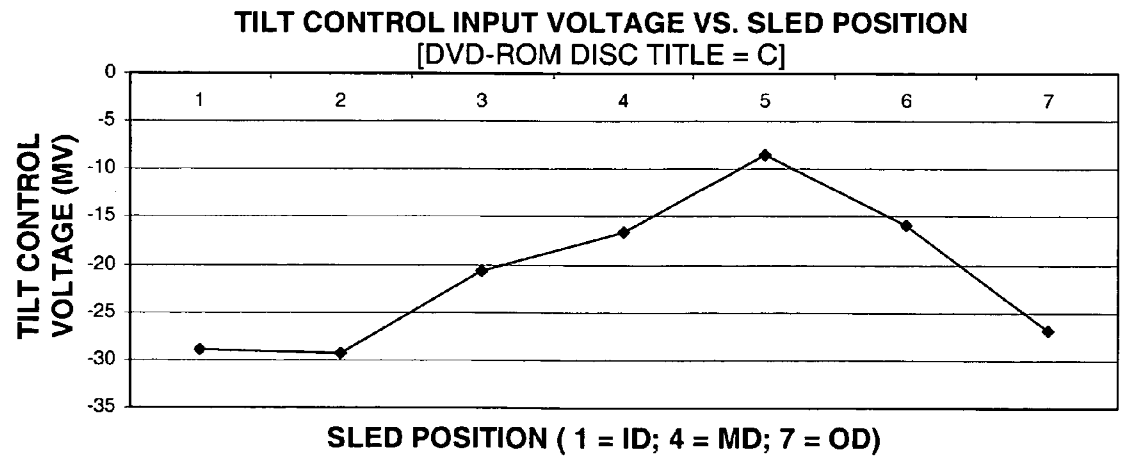

Referring to FIGS. 6(A-C), graphs illustrating relationships between a tilt control input voltage and sled position for each of the example optical discs A, B and C are shown. With respect to the first optical disc A (FIG. 6A), a second optical disc (FIG. 6B), and a third example optical disc (FIG. 6C). The designations ID, MD and OD generally refer to inner disc, mid-disc and outer disc, respectively.

Figure 7:
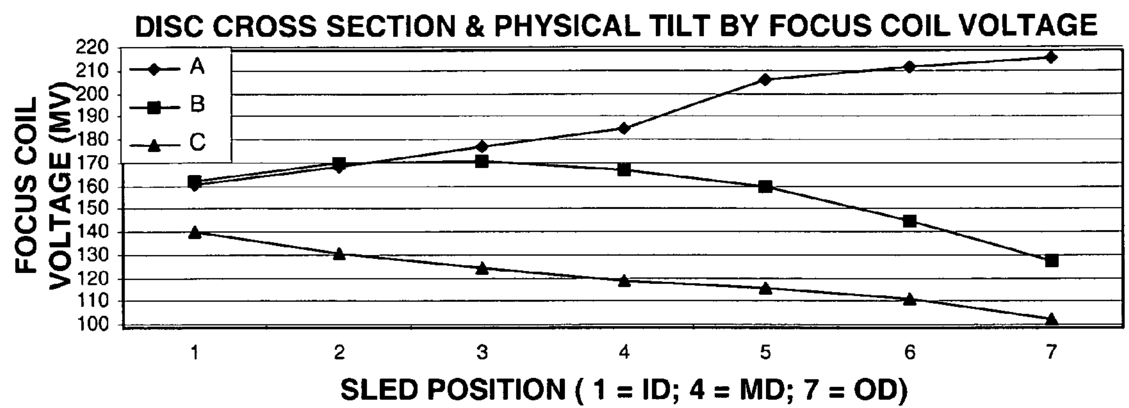
FIG. 7 is a graph illustrating a comparison of tilt measurements of the three example optical discs.

Referring to FIG. 7, a graph showing a comparison between disc cross section and physical tilt by focus coil voltage measurements for three example discs is shown. The designations ID, MD and OD generally refer to inner disc, mid-disc and outer disc, respectively.

Figure 8:
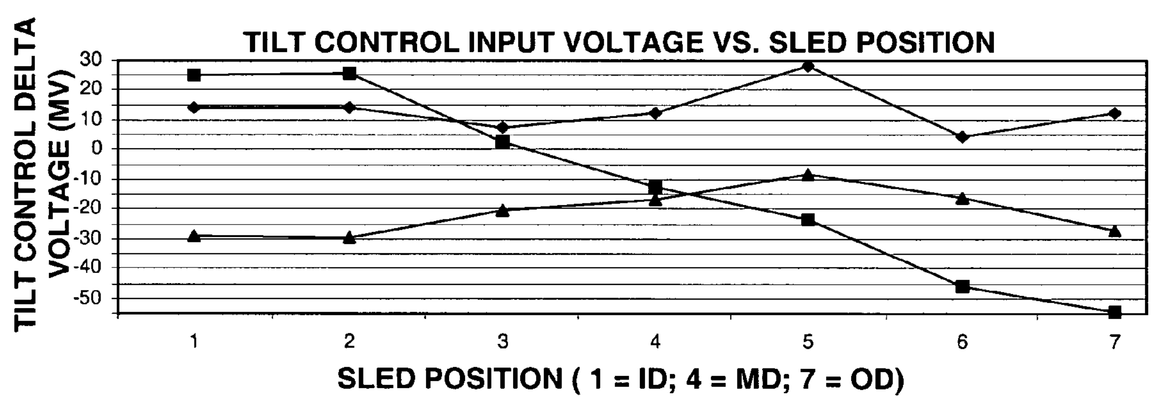
FIG. 8 is a graph illustrating a comparison between the tilt control input voltage versus sled position for the three example optical discs.

Referring to FIG. 8, a graph illustrating a relationship between tilt control input voltage and sled position for three example optical discs is shown. The designations ID, MD and OD generally refer to inner disc, mid-disc and outer disc, respectively.

Figure 9A:
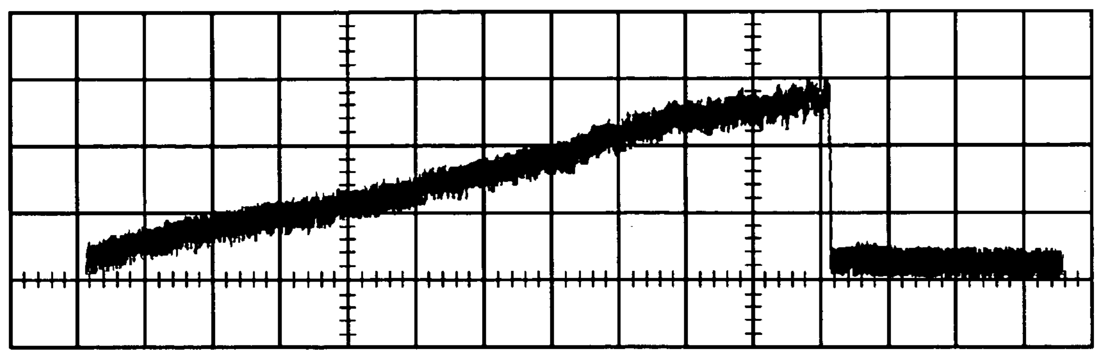
FIGS. 9(A-C) are oscilloscope waveforms illustrating focus coil voltage measurements for the three example optical discs.
Figure 9B:
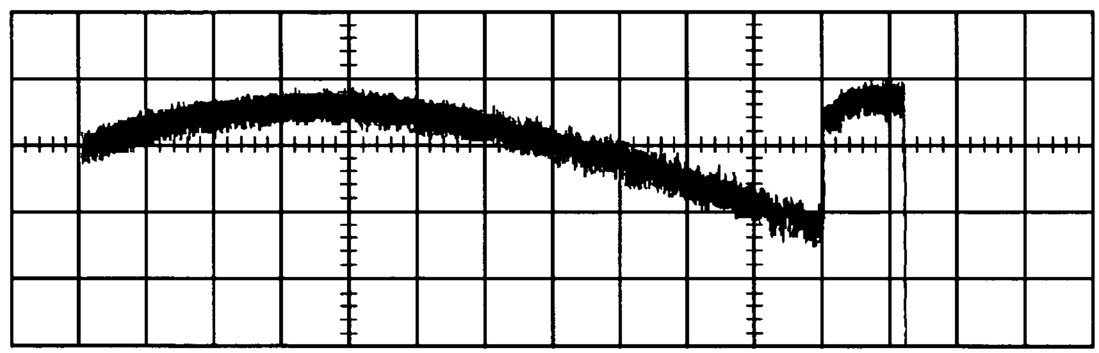
Figure 9C:
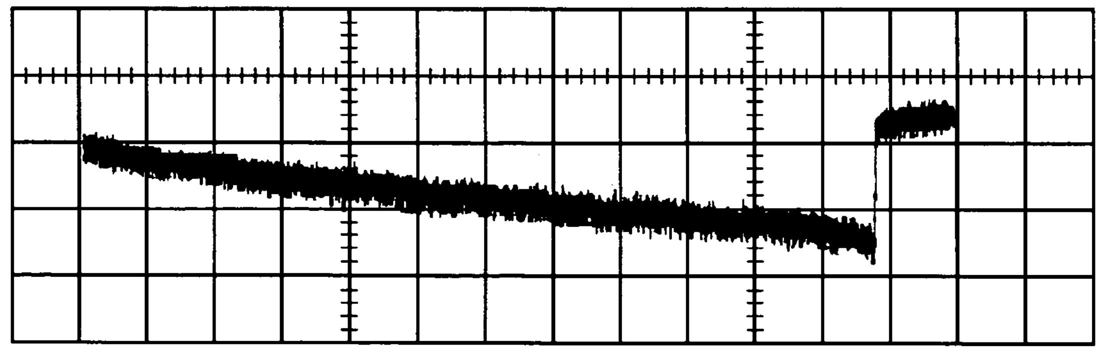

Referring to FIGS. 9(A-C), oscilloscope waveforms are shown illustrating focus coil voltage waveforms for the three example optical discs. The focus coil voltage waveform from disc A of FIG. 5A is shown in FIG. 9A. The focus coil voltage waveform from disc B of FIG. 5B is shown in FIG. 9B. The focus coil voltage waveform from disc C of FIG. 5C is shown in FIG. 9C. The higher bandwidth focus control voltage signals are generally sampled and averaged to extract the true DC value (or mean value) for DELTA_Y detection in the focus servo control implemented in accordance with the present invention.

Figure 10A:
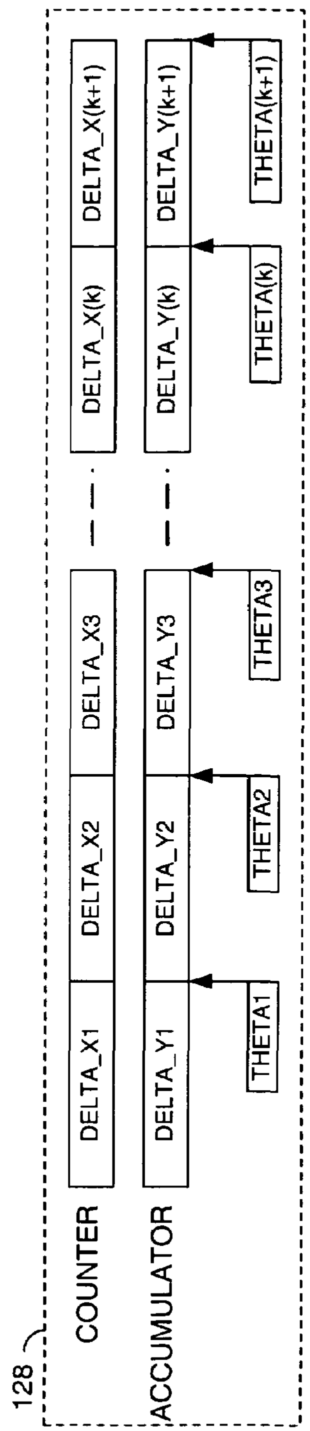
FIGS. 10(A-B) are block diagrams illustrating example operations of a tilt detect/control block of FIG. 2.

Referring to FIGS. 10(A-B), block diagrams illustrating example operations of the circuit 128 of FIG. 2 over a number of sampling intervals are shown. In one example, the circuit 128 may be implemented with a single accumulator and a single counter (e.g., FIG. 10A). The counter may be configured to track the sled position value DELTA_X. The accumulator may be configured to track the lens focus position value DELTA_Y. At the end of each sampling interval (e.g., 1, 2, 3, . . . k, etc.), the circuit 128 may be configured to generate a disc tilt angle output (e.g., THETA1, THETA2, THETA3, THETA(k), THETA(k+1), etc.). The disc tilt angle outputs generally represent a disc tilt angle determination (detection) based on measurement pairs of DELTA_X and DELTA_Y for the respective sampling interval (e.g., DELTA_X1, DELTA_Y1, . . . DELTA_X(k+1), DELTA_Y(k+1)).

Figure 10B:
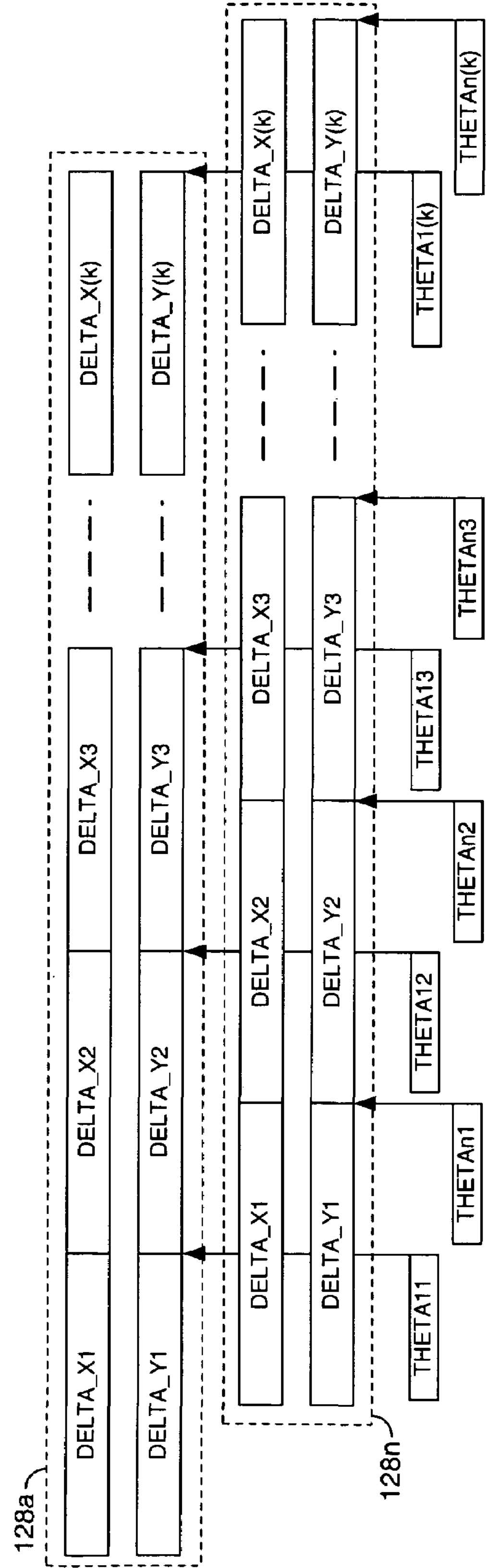

In an alternative example, multiple tilt detection and control circuits 128*a-n* may be implemented (e.g., FIG. 10B). Each of the tilt detection and control circuits 128*a-n* may comprise, for example, a counter and an accumulator. The sampling periods for the multiple counters and accumulators may be staggered to provide more frequent disc tilt angle outputs over a larger DELTA_X sampling period. The larger DELTA_X sampling periods generally provide higher resolution and accuracy in the disc tilt angle detection. The implementation of multiple DELTA_X counters and DELTA_Y (or FOO) accumulators (e.g., multiple phases) may be employed to implement the tilt detection and control with a smaller response (or control) time interval. For example, during a number of sampling intervals (e.g., 1, 2, 3, . . . , k), the circuit 128*a* may be configured to generate a disc tilt angle output (e.g., THETA11, THETA12, THETA13, THETA1(k), etc.) based on a corresponding number of measurement pairs (e.g., DELTA_X1, DELTA_Y1, . . . DELTA_X(k), DELTA_Y(k))

determined (or detected) by the circuit 128*a*. Similarly, the circuit 128*n* may be configured to generate a disc tilt angle output (e.g., THETAn1, THETAn2, THETAn3, THETAn(k), etc.) based on a corresponding number of measurement pairs (e.g., DELTA_X1, DELTA_Y1, . . . DELTA_X(k), DELTA_Y (k)) determined (or detected) by the circuit 128*n*. The disc tilt angle outputs of the individual circuit 128*a-n* may be arranged such that multiple disc tilt angle determinations occur in each sampling interval time.

The present invention may provide an ultimate solution for optical disc tilt servo control. The present invention may provide the first such solution in the history of optical disc storage development. The present invention is generally applicable to the current optical storage systems. However, the present invention also may benefit next generation optical storage systems having higher recording density (e.g., using new media and blue laser source). In general, the higher the recording density, the more difficult the tilt detection and tilt servo control.

The present invention may provide advantages over conventional solutions. The present invention may provide an ultimate solution that may be applicable to next generations of optical drives. The present invention may allow for simple implementation. The present invention may be implemented without additional hardware. The present invention may be easily implemented by firmware. The present invention generally provides a single beam solution. Since a single beam is used, there is generally no beam position error. The present invention may provide a solution that is sensitive and reliable with high resolution and low cost.

The function performed by the present invention may be implemented in hardware, software (firmware) or a combination of hardware and software. The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for detecting and controlling disc tilt in an optical disc mechanism comprising the steps of:

(A) measuring a plurality of 2-dimensional displacements of an optical lens of said optical disc mechanism in parallel, wherein measurements of said 2-dimensional displacements are staggered over a predetermined sampling interval and each of said 2-dimensional displacements comprises a sled position value and a lens focus position value;

(B) extracting an absolute value of a disc tilt angle in said optical disc mechanism based upon said plurality of 2-dimensional displacements; and (C) controlling deflection of a tilt moving coil according to said absolute value of said disc tilt angle, wherein (i) a control signal is generated in response to a predetermined reference level, a predetermined offset value and a scaled version of said disc tilt angle, (ii) said scaled version of said disc tilt angle comprises a product of a measured lens focus position value and a predetermined system gain value associated with said disc tilt, and (iii) said predetermined system gain value is determined based upon a predetermined track width value, a predetermined track count value, a sensitivity of a focus coil of said optical disc mechanism, a resistance of said focus coil, a sensitivity of a tilt coil of said optical disc mechanism, a resistance of said tilt coil, and a gain of a tilt coil driver of said optical disc mechanism.

2. The method according to claim 1, further comprising the steps of:

defining a system gain value with respect to disc tilt according to a geometric relationship of said optical disc mechanism.

3. The method according to claim 1, wherein said lens focus position value is determined based on a voltage applied to a lens moving coil.

4. The method according to claim 1, wherein said lens focus position value is measured based upon an averaged focus control signal.

5. The method according to claim 1, wherein said sled position is measured based upon a sled counter value.

6. The method according to claim 1, wherein said sled position is measured based upon a track counter value.

7. The method according to claim 1, wherein said predetermined track count value comprises a length of a sled displacement measurement section.

8. The method according to claim 7, wherein said length of said sled displacement measurement section is from 1,000 tracks to 4,600 tracks, inclusive.

9. The method according to claim 1, wherein said lens focus position value is detected in an analog domain in response to a voltage across a focus moving coil of said optical disc mechanism.

10. The method according to claim 1, wherein said lens focus position value is detected in a digital domain prior to a focus control digital-to-analog converter (DAC) of said optical disc mechanism.

11. An apparatus comprising:

means for measuring a plurality of 2-dimensional displacements of an optical lens of an optical disc mechanism in parallel, wherein measurements of said 2-dimensional displacements are staggered over a predetermined sampling interval and each of said 2-dimensional displacements comprises a sled position value and a lens focus position value;

means for extracting an absolute value of a disc tilt angle in said optical disc mechanism based upon said plurality of 2-dimensional displacements; and means for controlling deflection of a tilt moving coil according to said absolute value of said disc tilt angle, wherein said deflection controlling means is further configured to generate a control signal in response to said focus position value of said optical lens and a predetermined tilt control gain of said optical disc mechanism, wherein said predetermined tilt control gain is determined based upon a predetermined track width value, a predetermined track count value, a sensitivity of a focus coil of said optical disc mechanism, a resistance of said focus coil, a sensitivity of a tilt coil of said optical disc mechanism, a resistance of said tilt coil, and a gain of a tilt coil driver of said optical disc mechanism.

12. An apparatus comprising:

a first circuit configured to (i) measure a plurality of 2-dimensional displacements of an optical lens of an optical disc mechanism in parallel, wherein measurements of said 2-dimensional displacements are staggered over a predetermined sampling interval and each of said 2-dimensional displacements comprises a sled position value and a lens focus position value and (ii) extract an absolute value of a disc tilt angle of said optical disc mechanism based upon said plurality of 2-dimensional displacements; and a second circuit configured to control a tilt moving coil of said optical disc mechanism according to said absolute value of said disc tilt angle, wherein said second circuit is further configured to generate a control signal in response to said focus position value of said optical lens and a predetermined tilt control gain of said optical disc mechanism, wherein said predetermined tilt control gain is determined based upon a predetermined track width value, a predetermined track count value, a sensitivity of a focus coil of said optical disc mechanism, a resistance of said focus coil, a sensitivity of a tilt coil of said optical disc mechanism, a resistance of said tilt coil, and a gain of a tilt coil driver of said optical disc mechanism.

13. The apparatus according to claim 12, wherein said predetermined track count value comprises a length of a sled displacement measurement section.

14. The apparatus according to claim 13, wherein said length of said sled displacement measurement section is from 1,000 tracks to 4,600 tracks, inclusive.

15. An apparatus comprising:

a first circuit configured to (i) measure a plurality of 2-dimensional displacements of an optical lens of an optical disc mechanism in parallel, wherein measurements of said 2-dimensional displacements are staggered over a predetermined sampling interval and each of said 2-dimensional displacements comprises a sled position value and a lens focus position value and (ii) extract an absolute value of a disc tilt angle of said optical disc mechanism based upon said plurality of 2-dimensional displacements, wherein said first circuit comprises a plurality of tilt detection circuits coupled in parallel, wherein each of said plurality of tilt detection circuits is configured to generate one of the plurality of 2-dimensional displacement measurements such that each of the plurality of 2-dimensional displacement measurements is presented at a different phase of the predetermined sampling interval; and a second circuit configured to control a tilt moving coil of said optical disc mechanism according to said absolute value of said disc tilt angle.

16. The apparatus according to claim 15, wherein each of said tilt detection circuits comprises a counter configured to determine said sled position value and an accumulator configured to detect said lens focus position value.

* * * * *